(12) United States Patent
Taylor

(10) Patent No.: US 8,283,048 B2
(45) Date of Patent: Oct. 9, 2012

US008283048B2

(54) THERMAL BARRIER COATINGS AND ARTICLES MADE THEREFROM

(75) Inventor: Thomas Alan Taylor, Indianapolis, IN (US)

(73) Assignee: Praxair S. T. Technology, Inc., North Haven, CT (US)

( * ) Notice: Subject to any disclaimer, the term of this patent is extended or adjusted under 35 U.S.C. 154(b) by 0 days.

(21) Appl. No.: 13/198,227

(22) Filed: Aug. 4, 2011

(65) Prior Publication Data

US 2011/0287252 A1 Nov. 24, 2011

Related U.S. Application Data

(62) Division of application No. 11/540,724, filed on Oct. 2, 2006, now Pat. No. 8,017,230.

(60) Provisional application No. 60/731,264, filed on Oct. 31, 2005.

(51) Int. Cl.
*B32B 5/00* (2006.01)
*B32B 5/16* (2006.01)
*B32B 15/04* (2006.01)
*B32B 18/00* (2006.01)

(52) U.S. Cl. ........ 428/633; 428/623; 428/450; 428/433; 428/610; 428/697; 428/702; 428/469; 428/472

(58) Field of Classification Search .................. 428/432, 428/623, 632, 446, 450, 433, 434, 610, 622, 428/621, 633, 688, 689, 697, 702, 704, 937, 428/469, 472

See application file for complete search history.

(56) References Cited

U.S. PATENT DOCUMENTS

| | | | |
|---|---|---|---|
| 4,485,151 A | 11/1984 | Stecura | |
| 5,073,433 A | 12/1991 | Taylor | |
| 5,120,683 A | 6/1992 | Shaffer | |
| 5,320,909 A | 6/1994 | Scharman et al. | |
| 6,006,516 A | 12/1999 | Voss et al. | |
| 6,299,988 B1 | 10/2001 | Wang et al. | |
| 6,444,335 B1 | 9/2002 | Wang et al. | |
| 6,544,665 B2 | 4/2003 | Rigney et al. | |
| 6,558,814 B2 | 5/2003 | Spitsberg et al. | |
| 6,607,852 B2 | 8/2003 | Spitsberg et al. | |
| 6,733,908 B1 | 5/2004 | Lee et al. | |
| 6,740,364 B2 | 5/2004 | Lau et al. | |
| 2002/0018902 A1 | 2/2002 | Tsukatani et al. | |
| 2002/0025454 A1 | 2/2002 | Wang et al. | |
| 2002/0094448 A1 | 7/2002 | Rigney et al. | |
| 2003/0003328 A1 | 1/2003 | Spitsberg et al. | |
| 2003/0003329 A1 | 1/2003 | Wang et al. | |
| 2003/0027012 A1 | 2/2003 | Spitsberg et al. | |
| 2003/0113254 A1* | 6/2003 | Belov et al. ................ 423/608 |
| 2003/0224124 A1 | 12/2003 | Lau et al. | |

FOREIGN PATENT DOCUMENTS

| | | |
|---|---|---|
| EP | 1167565 A2 | 1/2002 |
| JP | 61101463 A | 5/1986 |
| JP | 63241152 A | 10/1988 |
| JP | 06065706 A | 3/1994 |
| JP | 07-144971 * | 6/1995 |

OTHER PUBLICATIONS

Machine Translation, Nagata et al., JP 07-144971, Jun. 1995.*
Claussen & Jahn, "Mechanical properties of sintered, in-situ reacted mullite-zirconia composites", J. Amer. Ceram. Soc. 63, No. 3-4, 229 (1980), (2 pages).
DePortu and Henney, "Microstructure and mechanical properties of mullite-zirconia composites", Trans. Brit. Ceram. Journal 83, 69-72 (1984), (4 pages).
Disam, J. et al., "Effect of Spraying Parameters of the LPPS Method on the Structure of Ceramics Coatings", Proceedings of the 1993 National Thermal Spray Conference, Anaheim, CA, XP-009080399, 1993, pp. 487-491, (5 pages) (June).
Hamidouche, et al., "Thermomechanical behavior of mullite-zirconia composite", J. Euro. Ceram. Soc. 16 (1996) 441-445, (5 pages).
Khor, et al., "Spark plasma sintering of Zr)2-mullite composites from plasma spherodized zircon / alumina powders", Mat. Sci. & Engr. A339 (2003), 286-296, (11 pages).
Latzel, et al., "New Environmental Barrier Coating System on Carbon-fiber Reinforced Silicon Carbide Composites", J. Thermal Spray, V 14 (2) Jun. 2005, ASM, p. 268-272, (5 pages).
Park, et al., "Preparation of zirconia-mullite composites by an infiltration route", Mat. Sci. & Engr. A405 (2005) 233-238, (6 pages).
Rangaraj and Kokini, "Interface thermal fracture in functionally graded zirconia-mullite-bondcoat alloy TBCs", Acta Met, (17 pages) 51 (2003) 251.
Rocha-Rangel, et al., "Zirconia-mullite composites by SPS from zirconia and alumina", J. Amer. Cer. Soc. 88 [55] 1150-1157 (2005), (8 pages).
Russel, et al., "Effects of mullite /YSZ coatings on performance of SiC /SiC composite combustion liners", Ceram. Engr. & Science Prox., V 21, N 4 (2000), Amer. Ceram. Soc., p. 243-250, (10 pages), (January).

* cited by examiner

*Primary Examiner* — Michael La Villa
(74) *Attorney, Agent, or Firm* — Nilay S. Dalal

(57) ABSTRACT

A thermally sprayed coating, coating system and coated article are disclosed. The disclosed embodiments of the thermally sprayed coating, coating system and coated article use a customized ceramic powder comprising ceramic powder particles having an average particle size of about 25 to about 75 microns. In particular, the ceramic powder particles contain from about 70 to about 95 percent by weight of a zirconia-based component, with the balance being an (alumina+silica)-based component and wherein said ceramic powder particles comprise micronized sub-particles of the zirconia-based component and the (alumina+silica)-based component.

12 Claims, No Drawings

THERMAL BARRIER COATINGS AND ARTICLES MADE THEREFROM

CROSS REFERENCE TO RELATED APPLICATIONS

This application is a divisional application of prior U.S. application Ser. No. 11/540,724, filed Oct. 2, 2006, now U.S. Pat. No. 8,017,230, which claims priority to U.S. Provisional Application Ser. No. 60/731,264, filed on Oct. 31, 2005, the disclosures of which are incorporated by reference herein.

FIELD OF THE INVENTION

This invention generally relates to methods of forming thermal barrier coating systems suitable for protecting components exposed to high temperature environments, such as the thermal environment of a gas turbine engine. More particularly, this invention relates to ceramic powders useful for forming thermal shock resistant coatings having the same composition, through deposition by thermal spray devices.

BACKGROUND OF THE INVENTION

Thermal barrier coatings have become essential for hot section components in aero and IGT turbine engines, to allow them to run at today's' high temperatures. The thermal barrier coating is considered a system, comprised of the superalloy substrate alloy, a metallic bondcoat and a zirconia-based outer ceramic layer. The zirconia ceramic has relatively low thermal conductivity and thus provides thermal insulation to the substrate. In the engine, the thermal barrier coating system is operated in a temperature gradient, with the zirconia surface exposed to the hot gas side of the turbine section and the substrate alloy of the blade, vane or combustor component typically air cooled on the back side.

Higher operating temperatures for gas turbine engines are continuously sought in order to increase their efficiency. However, as operating temperatures increase, the high temperature durability of the components of the engine must correspondingly increase. For this reason, the use of thermal barrier coatings on components such as combustors, high pressure turbine blades and vanes has increased in commercial as well as military gas turbine engines. The insulation of a thermal barrier coating enables components formed of superalloys and other high temperature materials to survive higher operating temperatures, increases component durability and improves engine reliability.

A need continues to exist for powders and thermal barrier coatings that can be deposited by thermal spray devices and that exhibit excellent thermal shock resistance. Therefore, a need continues to exist for developing new powders and for exploring their potential for thermal spray deposition of thermal shock resistant coatings. It would therefore be desirable in the art to provide powders and thermal barrier coatings that can be deposited by thermal spray devices and that exhibit excellent thermal shock resistance.

SUMMARY OF THE INVENTION

This invention relates in part to a thermally sprayed coating made from a ceramic powder comprising ceramic powder particles, said ceramic powder particles comprising a zirconia-based component and an (alumina+silica)-based component, wherein said ceramic powder particles contain from about 70 to about 95 percent by weight of the zirconia-based component, with the balance being the (alumina+silica)-based component, wherein the average particle size of the ceramic powder particles is from about 25 to about 75 microns, and wherein said ceramic powder particles comprise micronized sub-particles of the zirconia-based component and the (alumina+silica)-based component.

The invention may also be characterized as a thermal barrier coating system on the surface of a substrate, the thermal barrier coating system comprising: (i) at least one metallic or metallic/ceramic inner layer deposited onto the substrate; (ii) optionally at least one ceramic intermediate layer deposited onto the inner layer; and (iii) at least one ceramic top layer deposited onto the inner layer, or optionally the intermediate layer. The ceramic top layer comprises a thermally sprayed coating made from a ceramic powder comprising ceramic powder particles, wherein said ceramic powder particles contain from about 70 to about 95 percent by weight of a zirconia-based component, with the balance being an (alumina+silica)-based component, wherein the average particle size of the ceramic powder particles is from about 25 to about 75 microns, and wherein said ceramic powder particles comprise micronized sub-particles of the zirconia-based component and the (alumina+silica)-based component.

The invention may also be characterized as a coated article comprising: (i) a metallic or non-metallic substrate; (ii) at least one metallic or metallic/ceramic inner layer deposited onto the substrate; (iii) optionally at least one ceramic intermediate layer deposited onto the inner layer; and (iv) at least one ceramic top layer deposited onto the inner layer or the intermediate layer. The ceramic top layer comprises a thermally sprayed coating made from a ceramic powder comprising ceramic powder particles, wherein said ceramic powder particles contain from about 70 to about 95 percent by weight of a zirconia-based component, with the balance being a (alumina+silica)-based component, wherein the average particle size of the ceramic powder particles is from about 25 to about 75 microns, and wherein said ceramic powder particles comprise micronized sub-particles of the zirconia-based component and the (alumina+silica)-based component.

Finally, the invention may also be characterized as a composite ceramic article formed by thermally spraying a ceramic powder onto a removable substrate to form the composite ceramic article on said removable substrate, removing the composite ceramic article from said substrate, and pressure-less sintering the free-standing composite ceramic article in air at elevated temperature. As indicated above, the ceramic powder comprising ceramic powder particles having an average particle size from about 25 to about 75 microns and containing from about 70 to about 95 percent by weight of a zirconia-based component, with the balance being a (alumina+silica)-based component. The ceramic powder particles comprise micronized sub-particles of the zirconia-based component and the (alumina+silica)-based component.

In accordance with aspects of this invention, the desired properties in the applied thermal barrier coating (i.e., thermal conductivity, thermal expansion and strength) will be much more isotropic, not dependent upon testing direction in the coating. The coating properties will be simply related to the ceramic mixture composition linearly, not influenced by a massive and continuous mullite phase. The ceramic powder is easily made more consistently, the powder flows well in the coating equipment, and the powder has essentially little to no chemical shift in making the coating. The deposition efficiency is much greater, allowing the coating to be made much faster for less cost. The thermal barrier coatings of this invention provide thermal barrier protection of high temperature metallic substrates used in gas turbine engines or other high temperature machines.

The ceramic powder of this invention and with similar plasma spraying conditions allows the thermal barrier coating to be made without torch clogging and spitting and frequent interruptions to rebuild the torch. Also, the ceramic powders of this invention are about five times higher in deposition efficiency (fraction of powder deposited as coating of that sprayed). The thermal spraying process of this invention is simpler and avoids the extremely high temperature sintering cycles of methods employing cold pressing of ceramic powders and then sintering to obtain dense ceramic articles.

In a preferred embodiment, the desired composition range will be toward the high zirconia-based component (e.g., YSZ) end, typically from about 70 to about 95 weight percent, with the balance being the (alumina+silica)-based component (e.g., mullite). The ceramic powder is preferably sintered and spray dried at a temperature from about 1000° C. to about 1400° C. The ceramic powder of this invention should be cohesive enough to flow and not break apart in powder dispensing and in the thermal spray torch. A lower density powder of this invention can provide a lower density thermal barrier coating, which coating should desirably exhibit reduced thermal conductivity.

In another embodiment, when the thermal barrier coating of this invention is sprayed down on a pre-heated substrate, it will recrystallize the mullite in-situ, thereby removing one large shrinkage factor and making the coating more thermally stable. The thermal barrier coating should be heat treated for the best properties. In accordance with this invention, the deposition layer thickness may be changed (e.g., obtain increasingly thicker per torch pass) to make the coating crack in through-thickness segmentation cracks. This will desirably make the thermal barrier coating even more thermal shock resistant.

DETAILED DESCRIPTION OF THE INVENTION

As indicated above, this invention relates in part to ceramic mixtures comprising a zirconia-based component and an (alumina+silica)-based component, wherein said ceramic mixture contains from about 10 to about 95 percent by weight of the zirconia-based component and about 5 to about 90 percent by weight of the (alumina+silica)-based component, and wherein the size of the zirconia-based component is from about 0.1 to about 100 microns and the size of the (alumina+silica)-based component is from about 0.1 to about 100 microns.

Illustrative zirconia-based components include, for example, yttria-stabilized zirconia, ytterbia-stabilized zirconia, gadolinia-stabilized zirconia, and the like. The zirconia-based component can be stabilized in the tetragonal or cubic crystalline structure, or can be a mixture of two zirconia-based components, one stabilized as tetragonal and one stabilized as cubic. Stabilization can occur by additions selected from yttria, magnesia, calcia, hafnia, ceria, gadolinia, ytterbia, Lanthanides, or mixtures thereof.

Illustrative (alumina+silica)-based components include, for example, $3Al_2O_3.2SiO_2$ (mullite), silica+mullite, corundum+mullite, and the like. Preferred (alumina+silica)-based components are selected from the composition range forming the mullite structure.

The zirconia-based components and the (alumina+silica)-based components are conventional materials that are commercially available. The ceramic mixtures can be made by conventional methods, for example, mechanical mixing.

The ceramic mixtures of this invention may preferably contain from about 20 to about 95 percent by weight of the zirconia-based component and about 5 to about 80 percent by weight of the (alumina+silica)-based component, more preferably from about 40 to about 95 percent by weight of the zirconia-based component and about 5 to about 60 percent by weight of the (alumina+silica)-based component, and most preferably from about 60 to about 95 percent by weight of the zirconia-based component and about 5 to about 40 percent by weight of the (alumina+silica)-based component.

In the ceramic mixtures of this invention, preferably the size (diameter) of the zirconia-based component is from about 0.1 to about 60 microns and the size (diameter) of the (alumina+silica)-based component is from about 0.1 to about 60 microns, more preferably the size of the zirconia-based component is from about 0.1 to about 40 microns, and the size of the (alumina+silica)-based component is from about 0.1 to about 40 microns, even more preferably the size of the zirconia-based component is from about 0.1 to about 10 microns and the size of the (alumina+silica)-based component is from about 0.1 to about 10 microns, and most preferably the size of the zirconia-based component is from about 0.1 to about 2 microns and the size of the (alumina+silica)-based component is from about 0.1 to about 2 microns.

In the ceramic mixtures of this invention, the size of the zirconia-based component may be the same or different from the size of the (alumina+silica)-based component.

As indicated above, this invention also relates in part to ceramic powders comprising ceramic powder particles, said ceramic powder particles comprising a zirconia-based component and an (alumina+silica)-based component, wherein said ceramic powder particles contain from about 10 to about 95 percent by weight of the zirconia-based component and about 5 to about 90 percent by weight of the (alumina+silica)-based component, and wherein the average particle size of the ceramic powder particles is from about 1 to about 150 microns.

Illustrative zirconia-based components useful in the ceramic powders are described above. Illustrative (alumina+silica)-based components useful in the ceramic powders are also described above. The zirconia-based components and the (alumina+silica)-based components are conventional materials that are commercially available.

The ceramic powders (particles) of this invention may preferably contain from about 20 to about 95 percent by weight of the zirconia-based component and about 5 to about 80 percent by weight of the (alumina+silica)-based component, more preferably from about 40 to about 95 percent by weight of the zirconia-based component and about 5 to about 60 percent by weight of the (alumina+silica)-based component, and most preferably from about 60 to about 95 percent by weight of the zirconia-based component and about 5 to about 40 percent by weight of the (alumina+silica)-based component.

The average particle size of the ceramic powders (particles) useful in this invention is preferably set according to the type of thermal spray device and thermal spraying conditions used during thermal spraying. The ceramic powder particle size (diameter) can range from about 1 to about 150 microns, preferably from about 10 to about 100 microns, more preferably from about 25 to about 75 microns, and most preferably from about 40 to about 60 microns.

The thermal spraying powders useful in this invention can be produced by conventional methods such as agglomeration (spray dry and sinter or sinter and crush methods) or cast and crush. In a spray dry and sinter method, a slurry is first prepared by mixing a plurality of raw material powders and a suitable dispersion medium. This slurry is then granulated by spray drying, and a coherent powder particle is then formed by sintering the granulated powder. The thermal spraying powder is then obtained by sieving and classifying (if agglomerates are too large, they can be reduced in size by crushing). The sintering temperature during sintering of the granulated powder is preferably 1000 to 1400° C.

The thermal spraying powders according to this invention may be produced by another agglomeration technique, sinter and crush method. In the sinter and crush method, a compact is first formed by mixing a plurality of raw material powders followed by compression and then sintered at a temperature between 1200 to 1400° C. The thermal spraying powder is then obtained by crushing and classifying the resulting sintered compact into the appropriate particle size distribution.

The thermal spraying powders according to this invention may also be produced by a cast (melt) and crush method instead of agglomeration. In the melt and crush method, an ingot is first formed by mixing a plurality of raw material powders followed by rapid heating, casting and then cooling. The thermal spraying powder is then obtained by crushing and classifying the resulting ingot.

This invention further relates in part to thermally sprayed coatings made from a ceramic powder comprising ceramic powder particles, said ceramic powder particles comprising a zirconia-based component and an (alumina+silica)-based component, wherein said ceramic powder particles contain from about 10 to about 95 percent by weight of the zirconia-based component and about 5 to about 90 percent by weight of the (alumina+silica)-based component, and wherein the average particle size of the ceramic powder particles is from about 1 to about 150 microns.

Coatings may be produced using the ceramic powders of this invention by a variety of methods well known in the art. These methods include thermal spray (plasma, HVOF, detonation gun, etc.), laser cladding; and plasma transferred arc. Thermal spray is a preferred method for deposition of the ceramic powders to form the thermal barrier coatings of this invention. The thermal shock resistant coatings of this invention are formed from ceramic powders having the same composition.

The amount of the zirconia-based component and (alumina+silica)-based component can vary throughout the coating thickness. The thermally-sprayed coatings of this invention can comprise two or more sublayers in which the amount of the zirconia-based component and (alumina+silica)-based component continuously change throughout the sublayers. The thermally-sprayed coatings can comprise two or more sublayers in which the amount of the zirconia-based component and (alumina+silica)-based component discretely change from one sublayer to another.

In an embodiment, the sublayers can have a graded composition, continuously changing from a high concentration of one component to a lower concentration of that component, or from a low concentration of one component to a higher concentration of that component, in a direction away from a substrate or other layers. For example, the concentration of the (alumina+silica)-based component can continuously change from about 40 percent by weight, in that inner portion of the coating adjacent to another coating layer, to about 5 percent by weight, in that outer portion of the coating exposed to the environment. Similarly, the concentration of the zirconia-based component can continuously change from about 60 percent by weight, in that inner portion of the coating adjacent to another coating layer, to about 95 percent by weight, in that outer portion of the coating exposed to the environment.

The thermally-sprayed coatings can comprise two or more sublayers in which the zirconia-based component and (alumina+silica)-based component continuously change in size throughout the sublayers. The thermally-sprayed coatings can comprise two or more sublayers in which the zirconia-based component and (alumina+silica)-based component discretely change in size from one sublayer to another.

Additionally, the thermally sprayed coatings of this invention can comprise a plurality of vertical macrocracks homogeneously dispersed throughout the coating to improve its thermal shock resistance. Such coatings can be formed by methods known in the art. See, for example, U.S. Pat. No. 5,073,433, the teachings of which are incorporated herein by reference.

For example, the ceramic powder of this invention may be thermally deposited onto a substrate to form a monolayer having at least two superimposed splats of the deposited powders on the substrate in which the temperature of a subsequent deposited splat is higher than the temperature of a previously deposited splat. Next, the monolayer is cooled and solidified to produce a plurality of vertical cracks in the monolayer due to shrinkage of the deposited splats. The above steps are repeated to produce an overall coated layer in which each monolayer has induced vertical cracks through the splats. Preferably, the at least 70 percent of the vertical cracks in each monolayer are aligned with vertical cracks in an adjacent monolayer to form vertical macrocracks having a length of at least 4 mils up to the thickness of the coating and the coated layer has at least 20 vertical macrocracks per linear inch measured in a line parallel to the surface of the substrate.

A suitable thickness for the thermally sprayed coatings of this invention can be up to about 1000 microns depending on the particular application and the thickness of any other layers. High application temperatures, e.g., up to 1200° C., necessitate thick protective coating systems, generally on the order of 250 microns or more.

This invention yet further relates in part to articles comprising (i) a metallic or non-metallic substrate, (ii) at least one metallic or metallic/ceramic inner layer deposited onto the substrate, (iii) optionally at least one ceramic intermediate layer deposited onto the inner layer, and (iv) at least one ceramic top layer deposited onto the inner layer, or optionally the intermediate layer, said ceramic top layer comprising a thermally sprayed coating made from a ceramic powder comprising ceramic powder particles, said ceramic powder particles comprising a zirconia-based component and an (alumina+silica)-based component, wherein said ceramic powder particles contain from about 10 to about 95 percent by weight of the zirconia-based component and about 5 to about 90 percent by weight of the (alumina+silica)-based component, and wherein the average particle size of the ceramic powder particles is from about 1 to about 150 microns.

Illustrative articles include, for example, components of gas turbine engines, combustors, and other high temperature applications. Examples of articles include airfoils, nozzles, combustor liners, blades, vanes and the like.

Illustrative metallic and non-metallic substrates include, for example, metallic superalloys of various nickel-base, cobalt-base or iron-base compositions and ceramic materials composed of silicon carbide and silicon nitride based non-metallics.

Illustrative metallic and metallic/ceramic inner layers that can be deposited onto the substrate include, for example, thermally sprayed metallic bondcoat layers of NiCoCrAlY or NiCrAlY and oxide-dispersed layers of these metallic components with alumina or yttria particulates, or diffusion produced layers of aluminide or platinum-aluminide compounds.

Illustrative ceramic intermediate layers that optionally can be deposited onto the inner layer include, for example, single component coatings of yttria-stabilized zirconia, or employing other stabilizers, deposited with a controlled level of porosity, or additionally, with a controlled concentration of segmentation cracks running vertically through said layer.

Illustrative ceramic top layers that can be deposited onto the inner layer, or optionally the intermediate layer, include, for example, the thermally sprayed coatings of this invention described above.

A suitable thickness for the coating layers above can be up to about 1000 microns depending on the particular application and the thickness of any other layers. High application temperatures, e.g., up to 1200° C., necessitate thick protective coating systems, generally on the order of 250 microns or more.

This invention further relates in part to thermal barrier coating systems on the surface of a substrate, the thermal barrier coating system comprising (i) at least one metallic or metallic/ceramic inner layer deposited onto the substrate, (ii) optionally at least one ceramic intermediate layer deposited onto the inner layer, and (iii) at least one ceramic top layer deposited onto the inner layer, or optionally the intermediate layer, said ceramic top layer comprising a thermally sprayed coating made from a ceramic powder comprising ceramic powder particles, said ceramic powder particles comprising a zirconia-based component and an (alumina+silica)-based component, wherein said ceramic powder particles contain from about 10 to about 95 percent by weight of the zirconia-based component and about 5 to about 90 percent by weight of the (alumina+silica)-based component, and wherein the average particle size of the ceramic powder particles is from about 1 to about 150 microns.

Illustrative substrates include, for example, metallic superalloys of various nickel-base, cobalt-base or iron-base compositions and ceramic materials composed of silicon carbide and silicon nitride based non-metallics.

Illustrative metallic and metallic/ceramic inner layers that can be deposited onto the substrate include, for example, thermally sprayed metallic bondcoat layers of NiCoCrAlY or NiCrAlY and oxide-dispersed layers of these metallic components with alumina or yttria particulates, or diffusion produced layers of aluminide or platinum-aluminide compounds.

Illustrative ceramic intermediate layers that optionally can be deposited onto the inner layer include, for example, single component coatings of yttria-stabilized zirconia, or employing other stabilizers, deposited with a controlled level of porosity, or additionally, with a controlled concentration of segmentation cracks running vertically through said layer.

Illustrative ceramic top layers that can be deposited onto the inner layer, or optionally the intermediate layer, include, for example, the thermally sprayed coatings of this invention described above.

A suitable thickness for the coating layers above can be up to about 1000 microns depending on the particular application and the thickness of any other layers. High application temperatures, e.g., up to 1200° C., necessitate thick protective coating systems, generally on the order of 250 microns or more.

This invention also relates in part to methods of forming a thermal barrier coating system on the surface of a substrate, the method comprising (i) depositing at least one metallic or metallic/ceramic inner layer onto the substrate, (ii) optionally depositing at least one ceramic intermediate layer onto the inner layer, and (iii) depositing at least one ceramic top layer onto the inner layer, or optionally the intermediate layer, said ceramic top layer comprising a thermally sprayed coating made from a ceramic powder comprising ceramic powder particles, said ceramic powder particles comprising a zirconia-based component and an (alumina+silica)-based component, wherein said ceramic powder particles contain from about 10 to about 95 percent by weight of the zirconia-based component and about 5 to about 90 percent by weight of the (alumina+silica)-based component, and wherein the average particle size of the ceramic powder particles is from about 1 to about 150 microns.

Illustrative substrates include, for example, metallic superalloys of various nickel-base, cobalt-base or iron-base compositions and ceramic materials composed of silicon carbide and silicon nitride based non-metallics.

Illustrative metallic and metallic/ceramic inner layers that can be deposited onto the substrate include, for example, thermally sprayed metallic bondcoat layers of NiCoCrAlY or NiCrAlY and oxide-dispersed layers of these metallic components with alumina or yttria particulates, or diffusion produced layers of aluminide or platinum-aluminide compounds.

Illustrative ceramic intermediate layers that optionally can be deposited onto the inner layer include, for example, single component coatings of yttria-stabilized zirconia, or employing other stabilizers, deposited with a controlled level of porosity, or additionally, with a controlled concentration of segmentation cracks running vertically through said layer.

Illustrative ceramic top layers that can be deposited onto the inner layer, or optionally the intermediate layer, include, for example, the thermally sprayed coatings of this invention described above.

A suitable thickness for the coating layers above can be up to about 1000 microns depending on the particular application and the thickness of any other layers. High application temperatures, e.g., up to 1200° C., necessitate thick protective coating systems, generally on the order of 250 microns or more.

In accordance with the method of this invention, coatings may be produced using the ceramic powders of this invention by a variety of methods well known in the art. These methods include thermal spray (plasma, HVOF, detonation gun, etc.), laser cladding; and plasma transferred arc. Thermal spray is a preferred method for deposition of the ceramic powders to form the coatings of this invention. Such methods may also be used for deposition of the coating layers, e.g., metallic or metallic/ceramic inner layer, ceramic intermediate layer, and ceramic top layer, described above.

In the method of this invention, the thermal barrier coating system can be heat treated after coating, preferably in an inert or controllably oxidizing atmosphere. In an embodiment, only the inner layer is heat treated after coating. The heat treatment can be conducted at a maximum temperature of from about 600° C. to about 1200° C. for a period of from about 0.5 to about 10 hours, and at a heating and cooling rate to and from the maximum temperature of between about 5° C. per minute and about 50° C. per minute. In a preferred embodiment, the heat treatment is conducted in an inert or controllably oxidizing atmosphere, at a maximum temperature of from about 600° C. to about 1150° C. for a period of from about 0.5 to about 4 hours, and at a heating and cooling rate to and from the maximum temperature of between about 5° C. per minute and about 50° C. per minute.

In another embodiment, the ceramic top layer is deposited by electron beam physical vapor deposition. The electron beam physical vapor can use separate feedstock ingots for the zirconia-based component and for the (alumina+silica)-based component, and the relative deposition rates can be selected to produce the thermal barrier coating system of this invention. Alternatively, the ceramic top layer can be thermally sprayed onto the inner layer, or optionally the intermediate layer, that has been pre-heated to at least 500° C.

This invention yet further relates in part to composite ceramic articles formed by thermally spraying a ceramic powder onto a removable substrate to form the composite ceramic article on said removable substrate, removing the composite ceramic article from said substrate, and pressureless sintering the free-standing composite ceramic article in air at elevated temperature, said ceramic powder comprising ceramic powder particles, said ceramic powder particles comprising a zirconia-based component and an (alumina+silica)-based component, wherein said ceramic powder particles contain from about 10 to about 95 percent by weight of the zirconia-based component and about 5 to about 90 percent by weight of the (alumina+silica)-based component, and wherein the average particle size of the ceramic powder particles is from about 1 to about 150 microns.

Illustrative composite ceramic articles include, for example, solid ceramic high temperature furnace kiln ware, high temperature laboratory furnace tubes and sample boats, planar substrates for electronic circuitry and complex ceramic shapes difficult to make by conventional cold press and sinter methods.

As indicated above, this invention relates to thermal shock resistant ceramic coatings that can be deposited through thermal spray devices such as plasma, HVOF or detonation gun. The thermal shock resistant coatings are formed from ceramic powders having the same composition.

The ceramic powders of this invention are useful for forming coatings or objects having excellent thermal shock properties, for example, thermal shock resistant coatings for protecting surfaces undergoing sliding contact with other surfaces such as propulsion and power generation applications.

This invention is generally applicable to components subjected to high temperatures, and particularly to components such as the high and low pressure turbine vanes, nozzles, blades, buckets, shroud, combustor liners and augmentor hardware of gas turbine engines. This invention provides thermal barrier systems that are suitable for protecting the surfaces of gas turbine engine components that are subjected to hot combustion gases. While the advantages of this invention will be described with reference to gas turbine engine components, the teachings of this invention are generally applicable to any component on which a thermal barrier coating may be used to protect the component from a high temperature environment.

The examples that follow are intended as an illustration of certain preferred embodiments of the invention, and no limitation of the invention is implied.

Example 1

Commercially available yttria-stabilized zirconia (YSZ) and mullite powders were blended together and the resulting mixture was plasma sprayed to make coatings. The mean particle diameters were about 80 microns (YSZ) and 100 microns (mullite). An upstream injection plasma torch was used, and the powders were each about 50 micron average particle size.

Difficulties were encountered with this approach. The two components have widely differing melting points (YSZ at about 2700° C., mullite at about 1800° C.). To melt the YSZ requires high torch energy, which over-melts the mullite component. This leads to torch clogging and spitting, poor deposition efficiency for the mullite and thus a major chemical shift from powder blend to coating. For a 75 mullite/25 YSZ blend (weight percent) powder, about a 45 mullite/55 YSZ (weight percent) coating was obtained. The microstructure showed YSZ particles encased in a mullite matrix, making mullite the continuous phase in the coating. The structure was highly anisotropic, with thick layers of differing composition and differing in the in-plane and through-thickness directions of the coating.

In another evaluation, the individual components were made very small, and combined into a powder particle of normal size, so that the powder particle could be dispensed and plasma sprayed with normal equipment. This was accomplished by taking commercial coarse mullite powder (about 100 micron size) and crushing and commuting it down to about 1 micron particle size. The same was done to fused and crushed coarse yttria-stabilized zirconia. About 7 weight percent yttria in zirconia was used in this example. The fine dusts would not dispense or plasma spray normally so the fine components were mixed in a slurry and spray-dried to spherical powders of about 60 micron average size. These powder particles, estimated to each contain several tens of thousands of micronized sub-particles, dispensed very well and plasma sprayed with the same torch with no spitting or clogging. The new coating was very close to the mixture composition of the powder, only about one percent increase in YSZ (compared to over 100 percent increase in YSZ by the conventional coarse powder blend method). The new coating structure was very isotropic, not dependant upon direction in the coating, and comprised of islands of original micronized mullite/YSZ composite particles that only partially melted surrounded by a mixture of mullite and YSZ that was melted.

Example 2

Coatings were made by the conventional coarse powder blend method of 74 mullite/26 YSZ (weight percent), and additionally the pure coarse mullite and coarse YSZ components as separate coatings. The substrate was steel with a CoNiCrAlY plasma sprayed bondcoat. Samples were heated of all three coated substrates in vacuum up to 850° C., 1000° C. and 1080° C. in individual runs, new coatings in each case. In each case, the mullite and the 74 mullite/26 YSZ (weight percent) blend coatings spalled completely from the substrate, yet the pure YSZ coating did not. This led to the development of a pure YSZ undercoat, applied on top of the CoNiCrAlY bondcoat, then applying a top coat of the mullite/YSZ blend coating. Using the new powder for the top coat, this multi-layer system did not spall in the high temperature cycle to 1080° C. The new powder was comprised of micronized sub-components in a 50 mullite/50 YSZ ratio (weight percent) having a mean powder macro-particle size of about 66 microns. The cause of this was the very low thermal expansion behavior of mullite and the old method mullite/YSZ blend coating, and that the higher expansion YSZ inner layer thus graded the thermal expansion much better between steel, bondcoat, inner YSZ layer and blend layer. The new micronized powder has higher expansion for the same blend ratio.

Example 3

Thermal expansion measurements were done on the coarse blend coatings (45 mullite/55 YSZ weight percent in coating; made from starting powder particles having an average diameter of about 90 microns) and the micronized powder coatings (both 50 mullite/50 YSZ weight percent and 27 mullite/73 YSZ weight percent in coating; made from starting powder particles having an average diameter of about 65 microns).

First the coatings were thermally stabilized by a pre-cycle to 1080° C., and then tested again for pure thermal expansion. In the coarse powder coatings, mullite and compositions high in mullite had low thermal expansion, the blend being closer to pure mullite than expected by the blend percentage. The micronized powder coating blends had expansion values that were found to follow a straight line between pure mullite and pure YSZ. This is a consequence of the two coating structures. The non-isotropic structure using coarse powder had a continuous phase of mullite with YSZ islands entrapped. This allowed the mullite phase to control the overall thermal expansion behavior, particularly in the plane of the coating which was tested in the dilatometer. The new micronized powder coating being essentially isotropic and having no real continuous phase but a mixture of the two components, distributed everywhere, gave thermal expansion behavior expected by the actual mixture of mullite and YSZ.

Example 4

The first cycle in the dilatometer of either process coarse powder blend coatings (45 mullite/55 YSZ weight percent in coating; made from starting powder particles having an average diameter of about 90 microns) or micronized powder coatings (both 50 mullite/50 YSZ weight percent and 27 mullite/73 YSZ weight percent in coating; made from starting powder particles having an average diameter of about 65 microns) showed a drop in sample length starting at 925° C. and ending at 975° C. This amount of drop was proportional to the amount of mullite present, and was as much as 0.65 percent in length for a pure mullite coating. This drop was found later by x-ray diffraction of samples heated to below and above the length drop temperature, to be due to recrystallization of amorphous mullite. The mullite fraction when melted and splat cooled apparently became amorphous (although some was still crystalline even as-coated). By separate furnace heat treating of the blended coatings at temperatures above the recrystallization, the effect could be removed and the coating was thus thermally stable. If the substrate was heated during the coating operation, much of the recrystallization could be obtained in-situ.

Example 5

The thermal conductivity of the coatings set forth in the Table below was measured to see if a useful thermal barrier could be produced with low values of thermal conductivity, even with the high conductivity mullite added. Thin coatings of about 25 milliliters thickness were made, half by half inch in area on metal substrates and the coating was removed from the substrate for the laser flash method of determining thermal diffusivity. Specific heat was separately measured, as was the coating density using free coupons of the same coating made on the same coating load. Density was measured by the immersion method, ASTM B-328. Thermal conductivity is the product of thermal diffusivity, specific heat and density. The direction of heat flow is through the thickness of the coating in all the following results. Density is given as percent of theoretical. The average starting powder size for the coarse blend coatings was about 90 microns and for the micronized powder coatings was about 65 microns.

| Thermal Conductivity at 100° C. (BTU) | | |
|---|---|---|
| Composition, Mullite/YSZ (Weight Percent) | Density | Thermal Conductivity |
| Old, coarse powder coatings | | |
| 100 YSZ | 86.8 | 6.85 |
| 100 Mullite | 84 | 7.64 |
| 45 Mullite/55 YSZ | 88 | 8.34 |
| New, micronized powder coatings | | |
| 27 Mullite/73 YSZ | 91.4 | 10.08 |
| 27 Mullite/73 YSZ | 83 | 8.41 |
| 50 Mullite/50 YSZ | 86.7 | 8.41 |
| 50 Mullite/50 YSZ | 74 | 6.60 |

To put these values in perspective, a metallic coating such as a NiCrAlY would have thermal conductivity between 10 to 20 times higher than all the above values. Adding mullite to YSZ increases the conductivity, and still produces a good thermal barrier coating having relatively low conductivity. However, if the density of the mullite/YSZ coating is allowed to be reduced, the conductivity could be made equal or slightly less than YSZ at a higher coating density. In this example, a designed experiment was done to vary both coating density as well as the mullite to YSZ ratio in the coating. The thermal conductivity at 100° C. was measured, and multiple correlation methods were used to obtain the following dependence:

Thermal Conductivity($BTU$)=−7.37+2.77*density−0.076*mullite+0.058*density*mullite where density is in gm/cm$^3$ and the mullite term is the weight percent mullite in the starting powder.

This latter simplification is valid because, with the new micronized powder, the mullite composition hardly changes in the coating. The equation shows linear dependence on density and percent mullite in the coating, and also an interaction term between density and percent mullite. The overall effect is for thermal conductivity to decrease with coating density decrease and increase with higher mullite. These results are for the coating in the as-coated state.

Example 6

Plasma sprayed coatings were made with the process coarse powder blend (starting from powders having an average particle diameter of about 90 microns) and the process micronized powder blend (starting from powders having an average particle diameter of about 65 microns). The coating sample weight was measured for a fixed period of coating time and this was related to the mass of powder dispensed to the torch in that time, with factors for the area of sample coated. This is a measure of the deposition efficiency. The following was found using the same model torch and torch power level:

| Powder type | Deposition Efficiency, % |
|---|---|
| Old process, coarse (74 Mullite/26 YSZ, weight percent) | 15 |

-continued

| Powder type | Deposition Efficiency, % |
|---|---|
| New process, micronized (50 Mullite/50 YSZ, weight percent) | 74 |

Thus, the use of the micronized powder of this invention showed about a 5 times improvement in deposition efficiency, and at the same time, very little shift in percent mullite in the coating over the powder as reported in Example 1.

Example 7

Plasma sprayed coatings were made with the new micronized powder of 50 mullite/50 YSZ (weight percent) on small substrates, then removed cleanly from those substrates. The average particle diameter for the starting powder for these coatings was about 66 microns. The density of the as-coated coating was determined by the immersion method (ASTM B-328). Then three coupons of the coating were heat treated in air for four hours at 1200° C. and also at 1300° C. The densities were measured of these heat treated samples. Density is given as actual and as percent of theoretical. The results are as follows: (density in gm/cm$^3$)

| Condition | Density | Theoretical Density %/ Standard Deviation (4.112 gm/cm$^3$) |
|---|---|---|
| As-coated | 3.553 | 86.30/0.47 |
| 4 hr 1200° C. | 3.733 | 90.68/0.38 |
| 4 hr 1300° C. | 3.723 | 90.43/0.43 |

It was thus found that the new powder and process can make high density ceramic bodies by first plasma spraying to a high green density and then sintering in air at modest temperatures of 1200° C. for four hours to obtain a stable higher density body that is not further densified at even higher temperature.

Other variations and modifications of this invention will be obvious to those skilled in the art. This invention is not limited except as set forth in the claims.

The invention claimed is:

1. A thermally sprayed coating made from a ceramic powder comprising ceramic powder particles, said ceramic powder particles comprising a yttria-stabilized zirconia component and a mullite-based component, wherein said ceramic powder particles contain from about 70 to about 95 percent by weight of the yttria-stabilized zirconia component, with the balance being the mullite-based component, wherein the average macro-particle size of the ceramic powder particles is from about 25 to about 75 microns, and wherein said ceramic powder particles comprise micronized sub-particles of the yttria-stabilized zirconia component and the mullite-based component, wherein the coating comprises a microstructure defined by islands of micronized mullite-based and yttria-stabilized zirconia composite particles, said islands partially melted and surrounded by a non-continuous phase of a completely melted mixture of said mullite-based component and said yttria-stabilized zirconia component, said melted mixture being distributed throughout the coating.

2. The thermally sprayed coating of claim 1 wherein the yttria-stabilized zirconia component of said powder particles is stabilized in the tetragonal or cubic crystalline structure.

3. The thermally sprayed coating of claim 1 wherein the mullite-based component is mullite, silica+mullite, or corundum+mullite.

4. The thermally-sprayed coating of claim 1 wherein the weight percent of the yttria-stabilized zirconia component and the weight percent of the mullite-based component varies throughout the coating thickness.

5. The thermally-sprayed coating of claim 1 comprising two or more sublayers in which (i) the weight percent of the yttria-stabilized zirconia component and the weight percent of the mullite-based component continuously change throughout the sublayers, or (ii) the amount of the yttria-stabilized zirconia component and mullite-based component discretely change from one sublayer to another.

6. The thermally-sprayed coating of claim 1 comprising two or more sublayers in which (i) the average particle diameter of the yttria-stabilized zirconia component and mullite-based component continuously change throughout the sublayers, or (ii) the average particle diameter of the yttria-stabilized zirconia component and mullite-based component discretely change from one sublayer to another.

7. The thermally-sprayed coating of claim 1 wherein the average particle diameter size of the ceramic powder particles is from about 40 to about 60 microns.

8. The thermally-sprayed coating of claim 1 wherein the thermally sprayed coating comprises a thermal barrier coating.

9. The thermally-sprayed coating of claim 1 wherein said ceramic powder has sufficient cohesiveness to flow and not break apart in powder dispensing.

10. A thermal barrier coating system on the surface of a substrate, the thermal barrier coating system comprising (i) at least one metallic or metallic/ceramic inner layer deposited onto the substrate, (ii) optionally at least one ceramic intermediate layer deposited onto the inner layer, and (iii) at least one ceramic top layer deposited onto the inner layer, or optionally the intermediate layer, said ceramic top layer comprising a thermally sprayed coating made from a ceramic powder comprising ceramic powder particles, said ceramic powder particles comprising a yttria-stabilized zirconia component and a mullite-based component, wherein said ceramic powder particles contain from about 70 to about 95 percent by weight of the yttria-stabilized zirconia component, with the balance being the mullite-based component, wherein the average macro-particle size of the ceramic powder particles is from about 25 to about 75 microns, and wherein said ceramic powder particles comprise micronized sub-particles of the yttria-stabilized zirconia component and the mullite-based component, wherein the coating comprises a microstructure defined by islands of micronized mullite-based and yttria-stabilized zirconia composite particles, said islands partially melted and surrounded by a non-continuous phase of a completely melted mixture of said mullite-based component and said yttria-stabilized zirconia component, said melted mixture being distributed throughout the coating.

11. An article comprising (i) a metallic or non-metallic substrate, (ii) at least one metallic or metallic/ceramic inner layer deposited onto the substrate, (iii) optionally at least one ceramic intermediate layer deposited onto the inner layer, and (iv) at least one ceramic top layer deposited onto the inner layer, or optionally the intermediate layer, said ceramic top layer comprising a thermally sprayed coating made from a ceramic powder comprising ceramic powder particles, wherein said ceramic powder particles contain from about 70 to about 95 percent by weight of a yttria-stabilized zirconia component, with the balance being a mullite-based component, wherein the average macro-particle size of the ceramic powder particles is from about 25 to about 75 microns, and wherein said ceramic powder particles comprise micronized sub-particles of the yttria-stabilized zirconia component and the mullite-based component, wherein the coating comprises a microstructure defined by islands of micronized mullite-based and yttria-stabilized zirconia composite particles, said islands partially melted and surrounded by a non-continuous phase of a completely melted mixture of said mullite-based component and said yttria-stabilized zirconia component, said melted mixture being distributed throughout the coating.

12. A composite ceramic article formed by thermally spraying a ceramic powder onto a removable substrate to form the composite ceramic article on said removable substrate, removing the composite ceramic article from said substrate, and pressure-less sintering the free-standing composite ceramic article at elevated temperature in an air atmosphere, an inert atmosphere or a controllably oxidizing atmosphere, said ceramic powder comprising ceramic powder particles, wherein said ceramic powder particles contain from about 70 to about 95 percent by weight of a yttria-stabilized zirconia component, with the balance being a mullite-based component, wherein the average macro-particle size of the ceramic powder particles is from about 25 to about 75 microns, and wherein said ceramic powder particles comprise micronized sub-particles of the zirconia-based component and the mullite-based component, wherein the coating comprises a microstructure defined by islands of micronized mullite-based and yttria-stabilized zirconia composite particles, said islands partially melted and surrounded by a non-continuous phase of a completely melted mixture of said mullite-based component and said yttria-stabilized zirconia component, said melted mixture distributed throughout the coating.

* * * * *